United States Patent [19]

Felicetta et al.

[11] 3,985,659

[45] Oct. 12, 1976

[54] DRILLING FLUID COMPOSITION

[75] Inventors: Vincent F. Felicetta; Donald E. Wenzel, both of Bellingham, Wash.

[73] Assignee: Georgia-Pacific Corporation, Portland, Oreg.

[22] Filed: Feb. 24, 1975

[21] Appl. No.: 552,722

[52] U.S. Cl. .......................... 252/8.5 A; 252/8.5 C; 260/17.5
[51] Int. Cl.² .......................................... C09K 7/02
[58] Field of Search ................... 252/8.5 A, 8.5 C; 260/17.5

[56] References Cited
UNITED STATES PATENTS

| | | | |
|---|---|---|---|
| 2,702,788 | 2/1955 | Dawson | 252/8.5 |
| 3,081,260 | 3/1963 | Park | 252/8.5 |
| 3,558,545 | 1/1971 | Lummus | 252/8.5 |
| 3,640,826 | 2/1972 | Lang et al. | 252/8.5 |
| 3,687,846 | 8/1972 | Lang | 252/8.5 |
| 3,816,308 | 6/1974 | LeBlanc | 252/8.5 |

OTHER PUBLICATIONS

Nam et al., Article in Journal of Polymer Science, Part A–1, vol. 9, 1971, pp. 855–866.

*Primary Examiner*—Herbert B. Guynn
*Attorney, Agent, or Firm*—Peter P. Chevis

[57] ABSTRACT

An aqueous drilling fluid comprising bentonite, or subbentonite and a water-soluble copolymer of lignosulfonate and a polyacrylate in a sufficient amount to increase the yield of the clay.

11 Claims, No Drawings

DRILLING FLUID COMPOSITION

This invention pertains to an aqueous drilling fluid. More particularly it pertains to a drilling fluid containing a copolymer of lignosulfonate and a polyacrylate to increase the yield of bentonite and subbentonite clays.

Drilling fluids are used in drilling of wells and have a number of functions which include the removal of cuttings from the well, seal off formation of gas, and to hold the cuttings and weighting materials in suspension in the event of shutdown in drilling. These fluids are generally thixotropic systems having proper viscosity for circulation through the well bore to carry the cuttings from the bottom of the hole and a proper gel rate and strength to prevent the settling of the cuttings or weighting materials when it becomes necessary to discontinue circulation of the fluid. Dispersed clay slurries having thixotropic properties have been most commonly used as a drilling fluid.

In the last few years, low-solids drilling fluids have gained in importance due to the faster drilling rates which may be obtained by the use of these fluids. The drilling rate increases with a decrease in concentration of the solids present in the fluid. Since water free of colloidal materials will not function adequately as a drilling fluid in many situations, drilling fluids containing a low colloidal solids content are being increasingly used. These fluids generally contain a small amount of bentonite or subbentonite clay and a polymer or copolymer which when added to the drilling fluid will increase the yield of the bentonitic clay to provide the desired viscosity and gel characteristics to the drilling fluid. Many of these polymers while increasing the yield of bentonite have a flocculating effect on other clays which aids in flocculation and removal of drilled clays and solids other than bentonite. The "yield" of a clay is defined as the number of barrels of 15 centipoise clay dispersion or mud which can be prepared from a ton of clay. The use of polyacrylates and graft copolymers of acrylic acid and polyhydroxy polymeric derivatives of cellulose or certain polysaccharides for this purpose are disclosed in U.S. Pat. Nos. 3,558,545 and 3,640,826.

It is, therefore, an object of this invention to provide a copolymer of lignosulfonate capable of beneficiating bentonite. A further object is to provide a low-solids drilling fluid containing a copolymer of lignosulfonate to beneficiate or increase the yield of bentonite present in the drilling fluid. A still further object is to provide a drilling fluid containing a copolymer of lignosulfonate and polyacrylate.

The above and other objects are attained by a drilling fluid composition comprising bentonite or subbentonite clay and a water soluble copolymer of lignosulfonate and a polyacrylate in a sufficient amount to increase the yield of the clay. The copolymer is obtained by polymerization of the acrylate monomer with the lignosulfonate in a weight ratio of 2:1 to 1:5 of the acrylate monomer to lignosulfonate. It has the property of beneficiating bentonitic clays to increase their yield and functions as a flocculating agent for low yield clays generally encountered in drilling operations.

The reaction or polymerization of the acrylate monomer with the lignosulfonate is effected using conventional grafting techniques of polymerizing vinyl monomers to polymers with free radical type reactions. The reaction is generally carried out by polymerization of the acrylate monomer in the presence of the lignosulfonate. Preferably an aqueous medium is used. In carrying out the reaction with free radical generation, an association of the acrylate copolymer with the lignosulfonate is obtained characteristic of graft type copolymers. Preferably, free radical initiators such as benzoyl peroxide, alpha-azobisisobutyronitrile, cumene hydroperoxide, and other free radical initiators such as hydrogen peroxide-metal redox system are used. High energy radiation such as gamma-radiation is also effective for most reactions and may be used. While the reaction is preferably carried in an aqueous medium, other solvents such as lower alcohols, acetone, dioxane, dimethyl sulfoxide and mixtures thereof, and others in which the lignosulfonate and the acrylate monomer are sufficiently soluble to effect the reaction may be employed. Preferably a mixture of water and one of the other solvents may be used when derivatives of acrylic acid having limited water solubility are used as one of the monomers for the formation of the acrylate polymer.

Lignosulfonates obtained from any source may be used for the polymerization with the acrylate polymer. Lignins are polymeric substances composed of substituted aromatics found in plant and vegetable tissue associated with cellulose and other plant constituents. In the pulp and paper industry, lignin-containing materials such as wood, straw, corn stalks, bagasse, and other vegetable and plant tissues are processed to recover the cellulose or pulp. The residual pulping liquors containing the lignin as by-products are thus one of the main sources of lignins. While there is some variations in the chemical structure of lignin, depending upon the plant from which lignin is obtained, place where the plant is grown, and also upon the method used in recovery or isolation of the lignin from the plant tissue, the basic structure and properties of the lignins are similar, all containing an aromatic nucleus through which the reaction may possibly be affected. Thus, lignins obtained by any method or from any source may be used in this reaction as long as the lignin is in a form which may at least be partially soluble in a solvent in which it may be polymerized with the acrylate polymer to form water-soluble copolymers.

Since the lignins separated from the plant may be chemically altered somewhat from that found in the plant, the term "lignins", as used herein, means the lignin products which are obtained upon separation from the cellulose or recovered from the plant. In the sulfite pulping process, the lignocellulosic material is digested with a sulfurous acid-metal bisulfite solution resulting in the sulfonation of the lignins. In other methods of the recovery or separation of the lignins from the plant, the lignins may not be sulfonated but may be chemically altered somewhat in some other manner. For example, in residual pulping liquors obtained in the sulfate and other alkaline pulping processes, the lignins are present as alkaline metal salts dissolved in the alkaline aqueous liquor. "Hydrolysis lignin" is obtained from the hydrolysis of lignocellulosic materials found in the plant. The lignin obtained by hydrolysis or by an alkaline pulping process as well as spent sulfite lignin may be sulfonated as well. Also, the lignin products such as a residual pulping liquor may be subjected to various treatments such as, for example, acid, alkaline or heat treatment or reacted with the other chemicals which may further alter somewhat the lignin constituents. The lignins remain operative as long as the treatment is not so severe as to destroy the basic aromatic polymeric structure.

The residual pulping liquors, or the lignin-containing product obtained in the separation or recovery of lignins from the plant, will generally contain lignins of various molecular weights varying from less than 1,000 to over 100,000. These liquors also may contain other constituents besides the lignins. For example, in the sulfite pulping process, the spent sulfite liquor contains lignosulfonates which may be present as salts or cations, such as magnesium, calcium, ammonium, sodium and other cations which may have been present during the sulfonation of the lignin. The spent sulfite liquor generally contains only about 40 to 60 weight percent on an oven-dried basis of lignosulfonates with the remainder being carbohydrates and other organic and inorganic constituents dissolved in the liquor. Lignin products obtained by other pulping processes may likewise contain other materials such as carbohydrates, degradation products of carbohydrates, and resinous materials which are separated from the lignocellulosic materials with the lignin. Lignin obtained by hydrolysis of lignocellulosic materials may not contain the carbohydrates but may contain resinous-type materials as well as other materials which are not removed by the hydrolysis. It is not necessary to separate the lignin-containing constituents from the other constituents. The lignin product as obtained containing all of the constituents may be used as such or subjected to different treatments such as alkaline, acid, or heat treatments as well as reacted with chemicals to modify or remove some of the non-lignin constituents prior to the polymerization reactions. Some reaction of the polyacrylate with the non-lignin constituents may be obtained, but the presence of the products of reaction of these constituents is not necessarily detrimental and may be somewhat beneficial. They are generally of lower molecular weight materials and can be easily removed from the final lignosulfonate-polyacrylate copolymer after reaction if desired, using methods, such as dialysis, gel permeation chromatography, chemical precipitation and extracting, or other methods well known in the art for the fractionation and recovery of high molecular weight organic water-soluble polymers from lower molecular weight materials. The lignin materials may also be separated from the non-lignin constituents and fractionated in fractions of various molecular weights prior to reaction with the acrylate monomer.

The acrylate monomer which is preferably used for the preparation of the polyacrylate is acrylic acid, since water soluble polyacrylates are obtained. Derivatives of acrylic acid such as methacrylic acid, acrylamide, alkyl esters of 1 to 2 carbon atoms of acrylic acid, and alkyl esters of 1 to 2 carbon atoms of methacrylic acid may also be used in mixtures with acrylic acid. Polymerization of these polyacrylates with lignosulfonate is obtained. The copolymers are water soluble or if not, most may be converted to water soluble products upon hydrolysis in an alkaline medium. The low-solid drilling fluids in which the additives are used are generally alkaline, at a pH usually in a range of 8 to 10.5. When a mixture of acrylic acid and a derivative of acrylic acid is used in preparation of the polyacrylate, the amount of the acrylic acid derivative employed generally is from about 10 to 90%, preferably 20 to 40%, but may be widely varied as long as the polyacrylate when grafted upon the lignosulfonate is water soluble or upon alkaline hydrolysis becomes water soluble. Lignosulfonate is hydrophilic and influences to a considerable extent the solubility of the lignosulfonate-polyacrylate copolymer obtained.

In the reaction of the lignin with polyacrylate using free radial initiators, it is preferred to carry out the reaction in an aqueous medium. However, when reactants or monomers are employed which have limited solubility in an aqueous medium other solvents such as alkanols having from 1 to 4 carbon atoms, acetone, dioxane, ethylene glycol, formamide, dimethylformamide, dimethylsulfoxide, and others may be used. Preferably the solvents which are water miscible and which can be used in mixture with water are preferred. In some of the reactions, the presence of an alcohol such as methanol may enhance the polymerization of the polyacrylate to the lignin molecule. However, it is not necessary to use an aqueous medium. The copolymerization of the lignosulfonate with the acrylate may be carried out in other mediums in which the reactants are at least partially soluble. For example, the medium used may be such that the lignin is only partially soluble swelling in the medium or a medium in which the lignosulfonate-polyacrylate will precipitate upon formation. The products obtained will vary somewhat depending upon the particular reaction employed for the polymerization of the lignin with the polyacrylate. For example the number and molecular weight of the polyacrylate side chains polymerized to the lignosufonate backbone presumably may differ when the reaction is carried out using a peroxide or chemical free radical initiator in place of radiation as well as when particular acrylic acid derivatives are polymerized in the formation of the polyacrylate. The weight ratio of the acrylate monomer to lignosulfonate used may be widely varied from a ratio of 2 to 1 to 1 to 5. Larger amounts of acrylate polymer may also be used. In the reaction in the formation of the polyacrylate copolymer with the lignin not all of the polyacrylate becomes grafted or associated with the lignin. Generally some homopolymer or copolymer of acrylic acid and the acrylic acid derivative is obtained. With large excesses of the acrylate monomer, the portion of the polyacrylate which is unassociated with the lignin increases. Generally it is preferred to use the reaction product as obtained which will usually have an intrinsic viscosity of at least 1.0 $dlg^{-1}$ preferably in the range of 1.2 to 3 $dlg^{-1}$ with the lignosulfonate-acrylate copolymer having an average molecular weight of at least 100,000. Often, the solubility characteristic of the lignosulfonate-polyacrylate copolymer and that of the polyacrylate itself may not differ sufficiently to effect a separation by solubility differences.

In using the lignosulfonate-polyacrylate copolymer, the methods and procedures normally used for low-solids muds are employed. The copolymer is added to the drilling fluid in a sufficient amount to beneficiate or increase the yield of the bentonite or bentonitic clay present in the drilling fluid which may vary widely depending upon the formation being drilled and the particular situation involved. Generally the additive is used in an amount from about 0.01 to 1 pound per barrel but may be decreased or increased in particular situations. The additives may be used with weighting materials, water loss agents, and also with other additives normally used with low-solids drilling fluids. The drilling fluids containing the lignosulfonate-polyacrylate copolymer are effective in presence of contaminants normally encountered in drilling operations such as sodium chloride or gypsum.

EXAMPLE I

A fermented calcium base spent sulfite liquor in an amount of 100 grams of 20% solution was mixed with 16 grams of acrylic acid. The reaction mixture was stirred and 4 milliliters of 30% hydrogen peroxide were slowly added. Upon addition of the hydrogen peroxide, an exothermic reaction occurred after which the solution was heated for 16 hours at 62° C with the reaction mixture gelling. The resulting gel was neutralized with 17 grams of 50% sodium hydroxide solution and then diluted with water to a concentration of about 5% solids and spray dried. The reaction mixture or product was a high molecular weight material containing less than 1% of acrylic acid as determined by gas chromatographic analysis. In determination of molecular weight by the agar gel diffusion method as described by J. Moacanin, H. Nelson, E. Back, V. F. Felicetta and J. L. McCarthy in the Journal of the American Chemical Society 81, 2054 (1959), only 90% of the reaction product diffused in the gel with about 10% being too large for diffusion. Of the portion which diffused into the gel the weight average molecular weight was 110,000. In the diffusion method, the analysis is based upon ultra-violet absorption of lignosulfonate which indicated that the lignosulfonate was present as a high molecular weight material. Intermixing a sodium polyacrylate with the unreacted calcium base, fermented liquor had no effect on the diffusion coefficient of the lignosulfonate. Also, when the reaction of the spent sulfite liquor was repeated except that the acrylic acid is omitted the weight average molecular weight obtained is about 37,000. The reaction mixture of the lignosulfonate and polyacrylate polymer had an intrinsic viscosity of 1.4 dlg$^{-1}$ in 0.1 molar sodium chloride solution at 25° C. A similar product was also obtained when the reaction of the lignosulfonate with the acrylate acid was repeated except that in addition to the 80% acrylic acid added, acrylamide was also added in an amount of 20% of the spent sulfite liquor solids.

The spray dried lignosulfonate-polyacrylate product was tested in low solids drilling fluids using API RP 13B, April, 1969, standard test procedures for drilling fluids. The mud system was prepared by intermixing bentonite in an amount of 12 pounds per barrel with water to which about ½ pound per barrel of sodium carbonate was added. The drilling fluid thus prepared was mixed for 3 hours to hydrate the clay prior to testing. A series of tests were made. To one portion of the fluid no additive was added, while various amounts of the lignosulfonate-polyacrylate copolymer were added to other portions of the drilling fluid. The results obtained with these samples were compared to comparative control samples containing a copolymer of maleic anhydride and vinyl acetate commercially sold for low solids drilling fluids. The results obtained with unweighted mud are shown in the following table:

| Additive | lbs/bbl | 24 Hour Cold Roll | | | | | | 20 Hour Hot Roll at 96°F | | | | | | | |
|---|---|---|---|---|---|---|---|---|---|---|---|---|---|---|---|
| | | IG | 600 | 300 | PV | Y | 10 Min. Gel | pH | IG | 600 | 300 | PV | Y | 10 Min. Gel | WL |
| Base Fluid | 0 | 1.0 | 11.0 | 7.0 | 4.0 | 3.0 | 8.0 | 10.3 | 1.0 | 10.5 | 7.0 | 3.5 | 3.5 | 8.0 | 15.6 |
| Lignin Polyacrylate | 0.025 | 5.5 | 21.5 | 19.0 | 2.5 | 16.5 | 22.0 | 10.3 | 2.5 | 24.5 | 17.5 | 7.0 | 10.5 | 22.0 | 15.4 |
| | 0.050 | 19.5 | 42.0 | 33.5 | 8.5 | 25.0 | 36.0 | 10.3 | 12.5 | 36.0 | 28.0 | 8.0 | 20.0 | 38.0 | 17.0 |
| Control | 0.025 | 10.0 | 36.0 | 27.5 | 8.5 | 19.0 | 22.0 | 10.3 | 10.0 | 33.0 | 25.0 | 8.0 | 17.0 | 26.0 | 14.8 |
| | 0.050 | 21.5 | 48.5 | 40.5 | 8.0 | 32.5 | 41.0 | 10.3 | 20.0 | 44.5 | 36.0 | 8.5 | 27.5 | 45.0 | 15.4 |

In addition to the runs above, the lignosulfonate-polyacrylate copolymer was likewise tested with the drilling fluid which contained barium sulfate in the amount of 250 pounds per barrel. The results obtained after rolling for 16 hours at room temperature are shown in the following table.

| Additive lbs/bbl | pH | IG | 600 | 300 | PV | Y | 10 Min. Gel | WL |
|---|---|---|---|---|---|---|---|---|
| 0 | 9.7 | 1.0 | 24.0 | 13.5 | 10.5 | 3.0 | 12 | 18.8 |
| 0.05 | 9.6 | 2.0 | 30.0 | 18.0 | 12.0 | 6.0 | 28 | 18.0 |
| 0.10 | 9.7 | 22.5 | 60.0 | 45.0 | 15.0 | 30.0 | 51 | 17.3 |
| 0.15 | 9.7 | 40.0 | 77.5 | 63.5 | 14.0 | 49.5 | 81 | 16.5 |
| 0.20 | 9.8 | 43.0 | 78.5 | 64.5 | 14.0 | 50.5 | 124 | 16.0 |
| 0.25 | 9.7 | 26.0 | 70.0 | 51.5 | 18.5 | 33.0 | 103 | 15.0 |

A test was also made with drilling fluids contaminated with salt and gypsum. The drilling fluid was prepared by mixing 12 pounds per barrel of bentonite to which about one pound of sodium carbonate per barrel was added. The clay was hydrated by mixing for 3 hours after which runs were made to which various amounts of sodium chloride and gypsum as contaminants were added. The lignosulfonate-polyacrylate copolymer additive was added to the drilling fluid in an amount of 0.050 pounds per barrel and compared to a control sample containing an equal amount of the maleic anhydride-vinyl acetate commercial additive. The results obtained after 16 hours cold roll are shown in the following table.

| Additive | Contaminants | Concentration of Contaminants lb/bbl | pH | IG | 600 | 300 | PV | Y | 10 Min. Gel | WL |
|---|---|---|---|---|---|---|---|---|---|---|
| Base Fluid | — | — | 10.2 | 6.0 | 17.0 | 11.5 | 5.5 | 6.0 | 12.0 | 16.2 |
| Lignin Polyacrylate | — | — | 10.2 | 21.0 | 39.5 | 33.0 | 6.5 | 26.5 | 23.0 | 18.2 |
| | NaCl | 1 | 10.3 | 17.5 | 37.0 | 31.5 | 5.5 | 26.0 | 17.0 | 19.0 |
| | NaCl | 4 | 10.3 | 14.0 | 31.5 | 25.5 | 6.0 | 19.5 | 13.5 | 20.6 |
| | Gypsum | 1 | 10.0 | 17.5 | 39.5 | 33.5 | 6.0 | 27.5 | 15.5 | 17.8 |
| | Gypsum | 5 | 7.9 | 9.0 | 17.5 | 14.0 | 3.5 | 10.5 | 10.0 | 29.0 |
| Control | — | — | 10.5 | 18.0 | 39.5 | 32.0 | 7.5 | 24.5 | 16.0 | 16.6 |

-continued

| Additive | Contaminants | Concentration of Contaminants lb/bbl | pH | IG | 600 | 300 | PV | Y | 10 Min. Gel | WL |
|---|---|---|---|---|---|---|---|---|---|---|
| | NaCl | 1 | 10.2 | 16.5 | 34.5 | 27.5 | 7.0 | 20.5 | 13.0 | 18.6 |
| | NaCl | 4 | 9.9 | 13.5 | 30.0 | 24.0 | 6.0 | 18.0 | 7.0 | 20.2 |
| | Gypsum | 1 | 10.2 | 19.0 | 42.5 | 35.0 | 7.5 | 27.5 | 17.0 | 17.0 |
| | Gypsum | 5 | 7.7 | 8.0 | 19.0 | 14.5 | 4.5 | 10.0 | 10.0 | 30.2 |

The product was also tested as a flocculant for a low yield clay. A slurry containing 4% of Panther Creek clay was prepared and the lignosulfonate-polyacrylate was added in various amounts and the time in seconds to settle to 50% of the volume in a 100 ml graduated cylinder was noted. The clay slurry was at a pH of 9. It contained in addition to the Panther Creek clay sodium chloride in amount of 1,000 parts per million and had a settling time of about 600 seconds without the additive.

The amounts of the additive used and the settling times obtained are shown in the table below:

| Additive Added, ppm | Time to Settle, Seconds |
|---|---|
| 2 | 95 |
| 5 | 70 |
| 10 | 44 |
| 200 | 43 |

What is claimed is:

1. An aqueous, low-solids drilling fluid composition comprising water, bentonite or subbentonite clay and a water-soluble graft copolymer of lignosulfonate and a polyacrylate in a sufficient amount to increase the yield of the clay, said copolymer being prepared by polymerization of the acrylate monomer with the lignosulfonate in a weight ratio of 2:1 to 1:5 of the acrylate monomer to lignosulfonate using a free radical initiator and said copolymer having a molecular weight of at least 100,000.

2. A composition of claim 1 wherein the polyacrylate is acrylic acid.

3. A composition of claim 2 wherein the lignosulfonate polyacrylate copolymer is present in the drilling fluid in an amount of from 0.01 to 1 pound per barrel.

4. A composition according to claim 2 wherein the acrylic acid and lignosulfonate are copolymerized to an extent that the intrinsic viscosity of the reaction mixture is at least 1.0 dlg$^{-1}$ in 0.1 M sodium chloride aqueous solution at 25° C.

5. A composition according to claim 4 wherein the intrinsic viscosity of the reaction mixture is in the range of 1.2 to 3.0 dlg$^{-1}$.

6. A composition according to claim 1 wherein the polyacrylate is a copolymer of acrylic acid and a monomer of a derivative of acrylic acid selected from the group consisting of methacrylic acid, acrylamide, alkyl esters of 1 to 2 carbon atoms of acrylic acid, and alkyl esters of 1 to 2 carbon atoms of methacrylic acids, said copolymer of polyacrylate and lignosulfonate being prepared by polymerization of acrylic acid and the acrylic acid derivative monomer with lignosulfonate using a free radical initiator, said acrylic acid being present in sufficient ratio to the acrylic acid derivative monomer to obtain a water soluble copolymer of lignosulfonate and the polyacrylate.

7. A composition of claim 6 wherein the acrylic acid derivative is acrylamide and is added in an amount of from 20 to 40 weight percent of the acrylic acid in the polymerization reaction.

8. A process of drilling a well comprising circulating in the well while drilling a drilling fluid composition of claim 1.

9. A process of drilling a well comprising circulating in the well while drilling a drilling fluid composition of claim 4.

10. A process of drilling a well comprising circulating in the well while drilling a drilling fluid composition of claim 5.

11. A process of drilling a well comprising circulating in the well while drilling a drilling fluid composition of claim 7.

* * * * *